(12) United States Patent
Yeiser

(10) Patent No.: US 11,089,764 B1
(45) Date of Patent: Aug. 17, 2021

(54) BIRD FEEDER SYSTEM

(71) Applicant: John Yeiser, Santee, CA (US)

(72) Inventor: John Yeiser, Santee, CA (US)

( * ) Notice: Subject to any disclaimer, the term of this patent is extended or adjusted under 35 U.S.C. 154(b) by 582 days.

(21) Appl. No.: 15/832,322

(22) Filed: Dec. 5, 2017

(51) Int. Cl.
*A01K 39/04* (2006.01)
*A01K 45/00* (2006.01)

(52) U.S. Cl.
CPC ............ *A01K 39/04* (2013.01); *A01K 45/002* (2013.01)

(58) Field of Classification Search
CPC ............................. A01K 39/04; A01K 45/002
See application file for complete search history.

(56) References Cited

U.S. PATENT DOCUMENTS

| | | | | |
|---|---|---|---|---|
| 2,005,602 A * | 6/1935 | Thomson | ............. | A01K 45/002 239/18 |
| 2,878,781 A * | 3/1959 | Wingfield | ............. | A01K 45/002 119/72 |
| 2,938,495 A * | 5/1960 | Hinton | ................. | A01K 45/002 119/69.5 |
| 5,966,868 A * | 10/1999 | Cox | ..................... | A01K 45/002 119/69.5 |
| 6,484,666 B1 * | 11/2002 | Reusche | ............. | A01K 45/002 119/69.5 |
| 6,684,813 B1 * | 2/2004 | Lemon | ................. | A01K 45/002 119/69.5 |
| 6,792,891 B1 * | 9/2004 | Coburn | .................. | A01K 39/02 119/57.8 |
| 7,530,330 B1 * | 5/2009 | Valle | ...................... | A01K 39/04 119/51.5 |
| 2003/0075113 A1 * | 4/2003 | Desatoff | ............. | A01K 45/002 119/69.5 |
| 2003/0101942 A1 * | 6/2003 | Reusche | ............. | A01K 45/002 119/69.5 |
| 2012/0018016 A1 * | 1/2012 | Gibson | .................... | A01K 7/00 137/561 R |

* cited by examiner

*Primary Examiner* — Jessica B Wong
(74) *Attorney, Agent, or Firm* — Bay State IP, LLC

(57) ABSTRACT

A bird feeder and bird bath system, the bird feeder and bird bath system designed to rest on a flat surface or be suspended from desired heights. The bird feeder portion includes at least one perch and a feeding cavity. The bird bath portion includes a bird bath with a fountain at the top of the system and or in the middle, the fountain powered by an interior pump. Multiple removable and interchangeable nozzle options, as well as numerous timing mechanisms afford the user with numerous control variables.

11 Claims, 13 Drawing Sheets

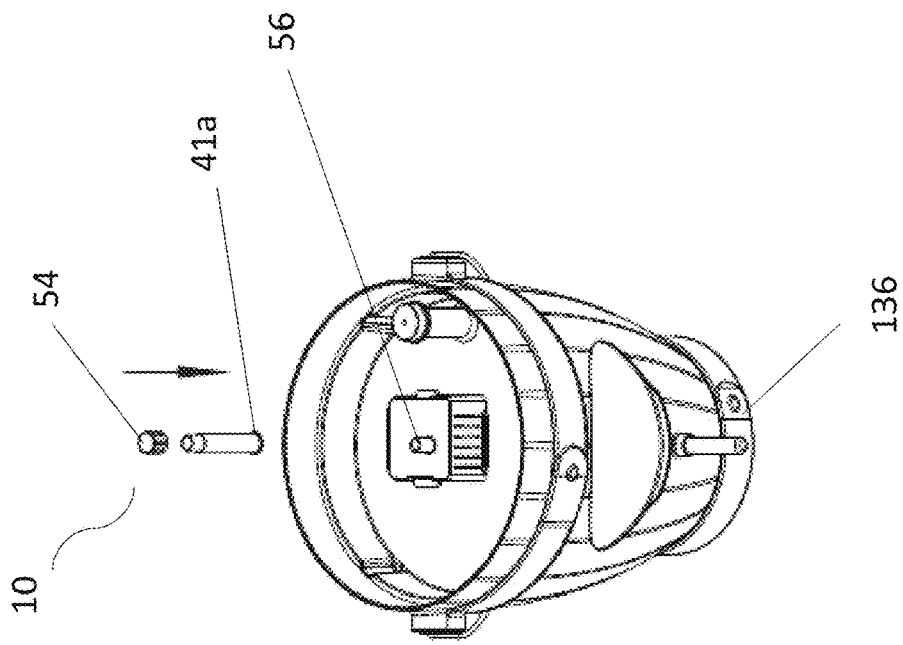
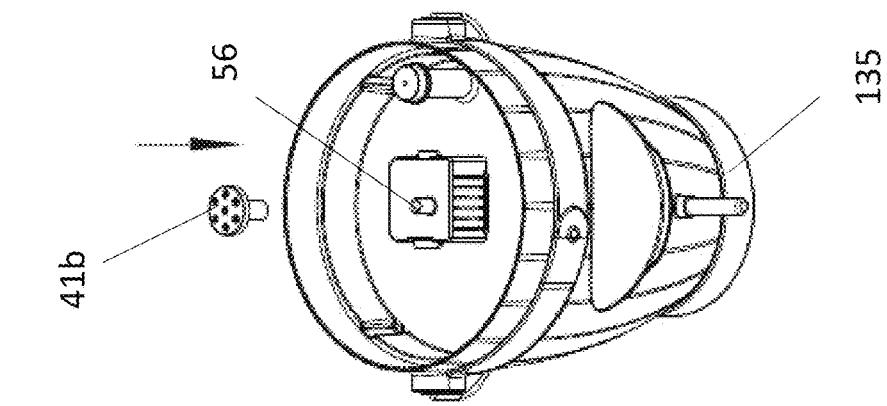
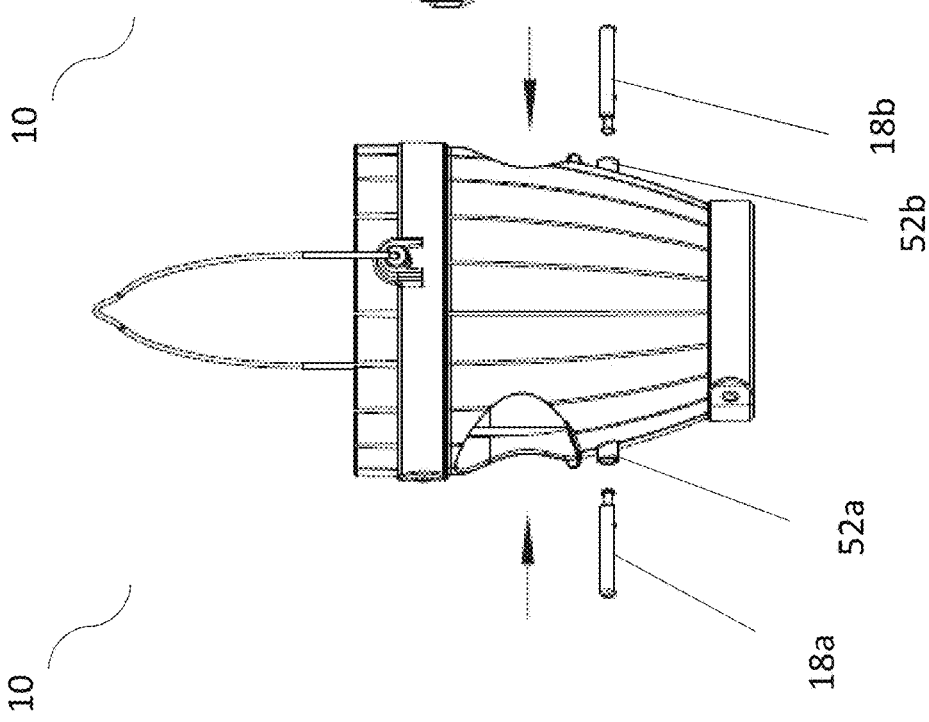

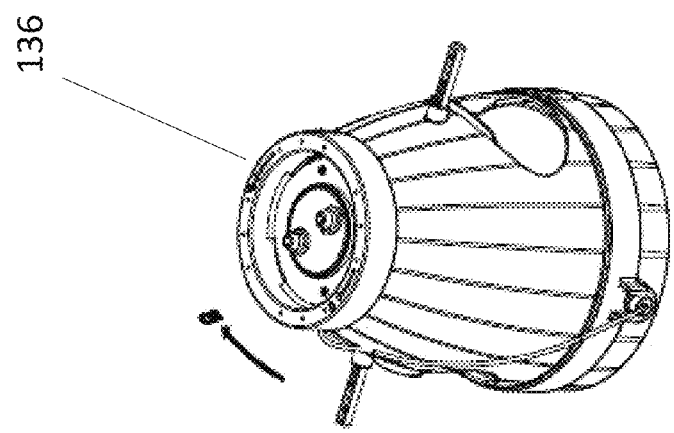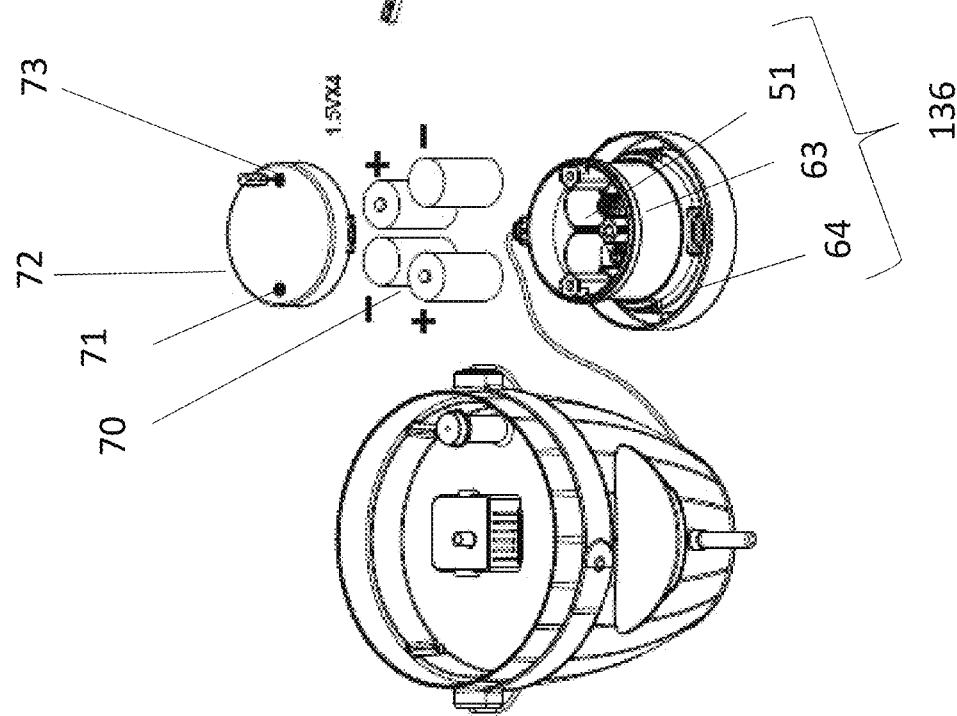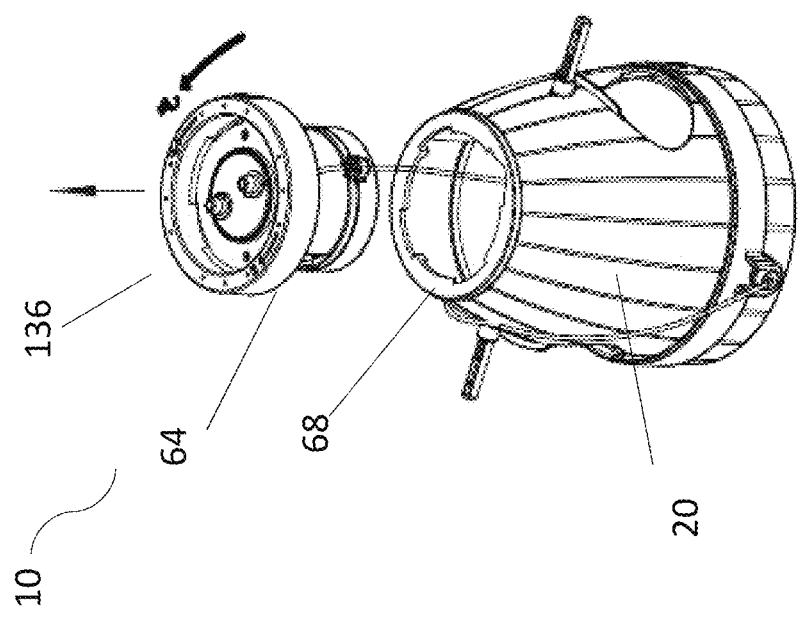

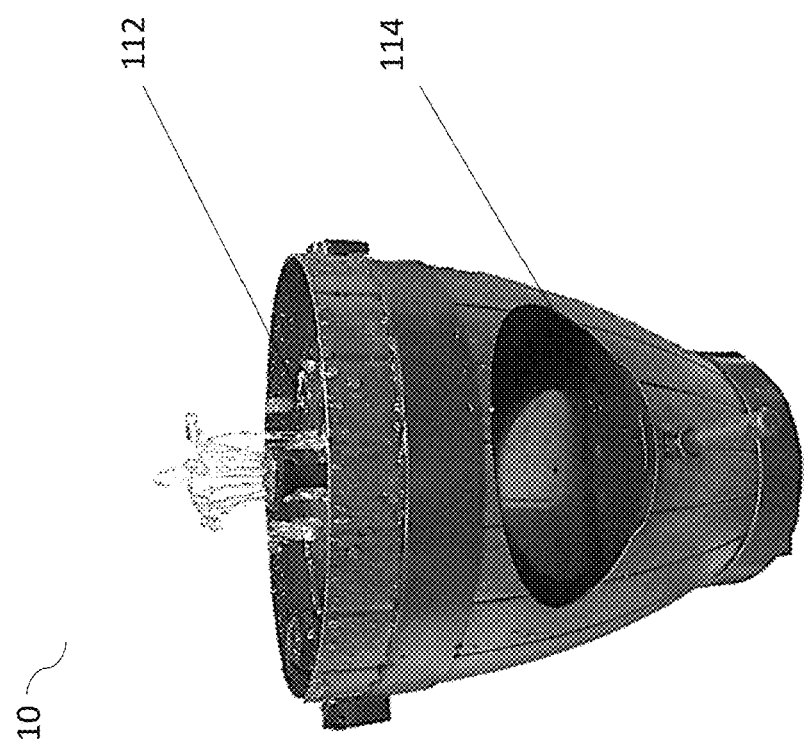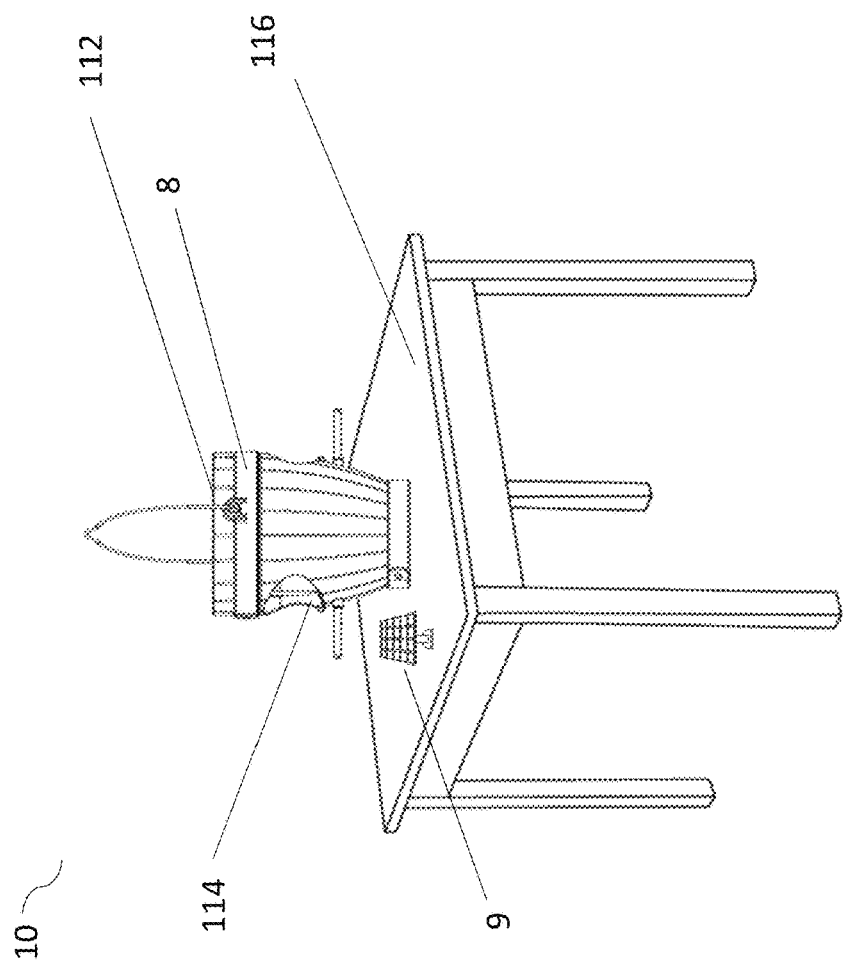

130

| Timing selection | 1 hour | 2hours | 3hours | 4hours |
|---|---|---|---|---|
| SW3 | H | L | L | H |
| SW4 | H | H | L | L |

FIG. 11

| Timing selection | Open 1 second + stop 23 seconds | Open 2 seconds + stop 22 seconds | Open 3 seconds + stop 21 seconds | Open 4 seconds + stop 20 seconds |
|---|---|---|---|---|
| SW3 | H | L | L | H |
| SW4 | H | H | L | L |
| | Repeat loop output | Repeat loop output | Repeat loop output | Repeat loop output |

FIG. 12

BIRD FEEDER SYSTEM

BACKGROUND OF THE INVENTION

Field of the Invention

The present system pertains to a water ejection and animal feeding systems and more particularly to a system and apparatuses for dispensing bird food combined with a bird bath structure which features a controllable fountain mechanism.

Description of the Related Art

Bird feeding in America has a storied history, including dating back to 1845, when Henry David Thoreau would feed birds at Walden Pond. By the end of the $19^{th}$ century, the table feeder was in use, while window feeding-trays appeared in the early 1900's. Bird feeding was encouraged by the National Audubon Society's magazine, Bird-Lore and by Bradford Torrey and Njelte Blanchan through their books. By 1910, more sophisticated bird feeders began to appear. Waldo Lee McAtee, a federal biologist, advocated using coconuts or tin cans with small holes as feeders because these feeders minimized the loss of food.

Commercial bird feeders became widely available in the 1920's with the first commercially made birdfeeder designed for hummingbirds going on the market in 1926. It has been estimated that a third of the adult population feeds wild birds in their backyards with more than 50 million Americans putting out a billion pounds of birdfeed each year. Seed feeders are the most common type of feeders and can vary in design from tubes to hoppers and trays.

SUMMARY OF THE INVENTION

The instant system, series of apparatuses and methods of usage, as illustrated herein, are clearly not anticipated, rendered obvious, or even present in any of the prior art mechanisms, either alone or in any combination thereof. A versatile system, series of apparatuses and methods of usage for creating and utilizing a bird feeder including a multifaceted water fountain system is disclosed. Thus the several embodiments of the instant apparatus are illustrated herein.

In one embodiment, the instant system contemplates a novel bird feeder apparatus, which also supplies a source of drinking water. In an additional embodiment, the instant system contemplates a novel portable bird feeder apparatus, which also supplies a source of drinking water.

In a further embodiment, the instant system contemplates a novel bird feeder apparatus, which also supplies a source of renewable drinking water. In one embodiment, the instant system contemplates a novel bird feeder apparatus including a bird bath structure featuring a fountain.

Further, the instant system contemplates an embodiment including a novel bird feeder apparatus, a bird bath structure featuring a fountain, and a source of renewable drinking water. In an added embodiment, the instant system contemplates a novel portable bird feeder apparatus, a bird bath structure featuring a fountain, and a source of renewable drinking water.

It is an object of the instant system to disclose a novel bird feeder apparatus which can operate while suspended or at rest on a flat surface.

The instant system also discloses a novel bird feeder apparatus comprising at least one detachable perch mechanism, and some embodiments multiple detachable perch mechanisms.

In one embodiment, the instant system contemplates a novel bird feeder apparatus including a handle and an S hook for hanging.

The instant system further discloses a novel bird feeder apparatus, in one embodiment, which is disposed to portray a wooden barrel.

In an additional embodiment, the instant system further discloses a novel bird feeder apparatus with multiple, interchangeable output tubes and a multi-hole output tube body. In another embodiment, the instant system contemplates a tall, single-hole output tube body.

It is an object of the present system to introduce a novel bird feeder apparatus with a fluid displacement or pump system for a fountain that is powered by batteries and to further reveal techniques which allow for the fountain to remain on constantly or for a designated amount time, after which it automatically turns off.

In conjunction with the above timing related features, it is an additional object to the instant invention to introduce, through utilization of a set of circuitry and a switch system, which may include a single switch mechanism, or two or more separate switch mechanisms working in tandem, a system which will start and stop automatically through a cycle of intervals or periods of an individual day, as well as continue this cycle on consecutive days.

The instant system also discloses a novel bird feeder apparatus, wherein seed and other feed products may be inserted through a cavity in some portion of the apparatus and the bird bath structure and fountain are located on the top.

It is an objective of the instant system to disclose a novel bird feeder apparatus, wherein seed and other feed products may be inserted through a large cavity in the center of the apparatus and the bird bath structure and fountain are located on the top portion.

It is an objective of the instant system to disclose a novel bird feeder apparatus, wherein seed and other feed products may be inserted through a large cavity in the top of the apparatus and the bird bath structure and fountain are located on the bottom portion.

The instant system also discloses a novel bird feeder apparatus that is easy to use, easy to install, light weight, inexpensive, and efficient.

There has thus been outlined, rather broadly, the more important features of the bird feeder apparatus in order that the detailed description thereof that follows may be better understood, and in order that the present contribution to the art may be better appreciated. There are additional features of the system that will be described hereinafter and which will form the subject matter of the claims appended hereto.

In this respect, before explaining at least one embodiment of the system in detail, it is to be understood that the system is not limited in its application to the details of construction and to the arrangements of the components set forth in the following description or illustrated in the drawings. The system is capable of other embodiments and of being practiced and carried out in various ways. Also, it is to be understood that the phraseology and terminology employed herein are for the purpose of description and should not be regarded as limiting.

These together with other objects of the system, along with the various features of novelty, which characterize the system, are pointed out with particularity in the claims annexed to and forming a part of this disclosure. For a better understanding of the system, its operating advantages and the specific objects attained by its uses, reference should be made to the accompanying drawings and descriptive matter in which there are illustrated preferred embodiments of the system.

The foregoing has outlined the more pertinent and important features of the present system in order that the detailed description of the system that follows may be better understood, and the present contributions to the art may be more fully appreciated. It is of course not possible to describe every conceivable combination of components and/or methodologies, but one of ordinary skill in the art may recognize that many further combinations or permutations are possible. Accordingly, the novel architecture described below is intended to embrace all such alterations, modifications, and variations that fall within the spirit and scope of the appended claims.

BRIEF DESCRIPTION OF THE DRAWINGS

Advantages of the present system will be apparent from the following detailed description of exemplary embodiments thereof, which description should be considered in conjunction with the accompanying drawings, in which having thus described the system in general terms, reference will now be made to the accompanying drawings, which are not necessarily drawn to scale, and wherein:

FIG. 3a illustrates a side view of one embodiment of the bird bath structure illustrating the perches and output tube;

FIG. 3b illustrates a top perspective view of one embodiment of the bird bath structure illustrating the perches and output tube;

FIG. 3c illustrates a top perspective view of one embodiment of the bird bath structure illustrating the perches, output tube and a removable bottom;

FIG. 4a-4c illustrate assembly views of the preferred embodiment of the pump located in the interior of the bird feeder system;

FIG. 8 illustrates an environmental view of the preferred embodiment of the bird feeder system in the packaging;

FIG. 9 illustrates an environmental view of the preferred embodiment of the bird feeder system while in use;

FIG. 11 illustrates a graph of the electrical distribution system including the electrical operations of the pumping system;

FIG. 12 illustrates a graph drawing of the electrical distribution system including the electrical operations of the pumping system; and, FIG. 13 illustrates a flow chart of the electrical distribution system including the electrical operations of the pumping system.

DETAILED DESCRIPTION OF THE SEVERAL EMBODIMENTS

The detailed description set forth below in connection with the appended drawings is intended as a description of presently preferred embodiments of the system and does not represent the only forms in which the present system may be constructed and/or utilized. The description sets forth the functions and the sequence of steps for constructing and operating the system in connection with the illustrated embodiments.

Figure 1B:
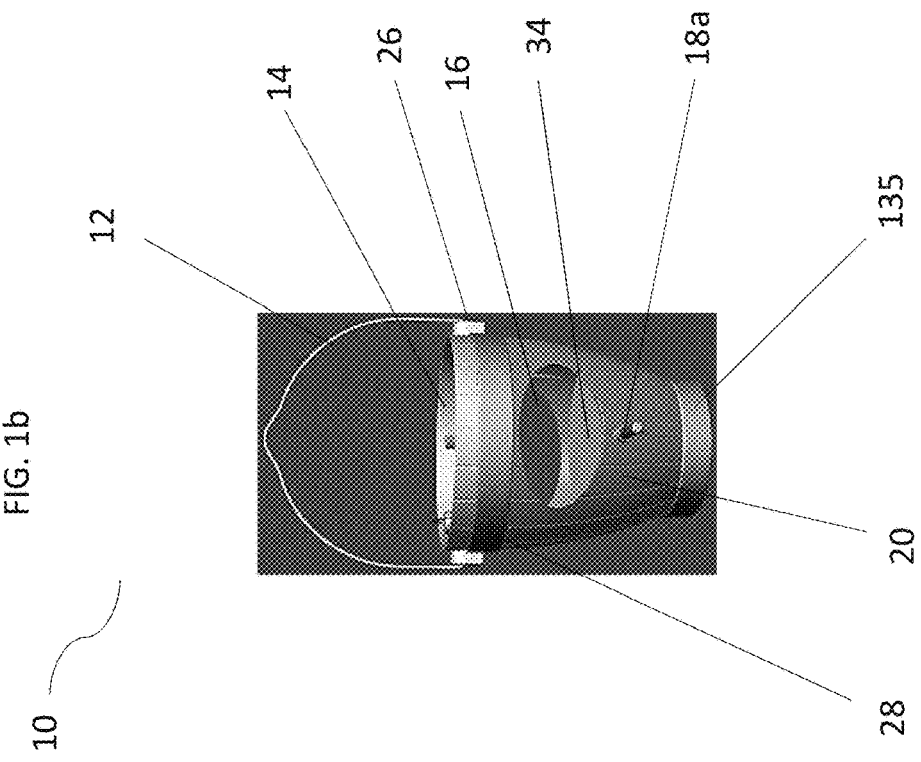
FIG. 1b illustrates a front view of one embodiment of the bird feeder system.
Figure 1A:
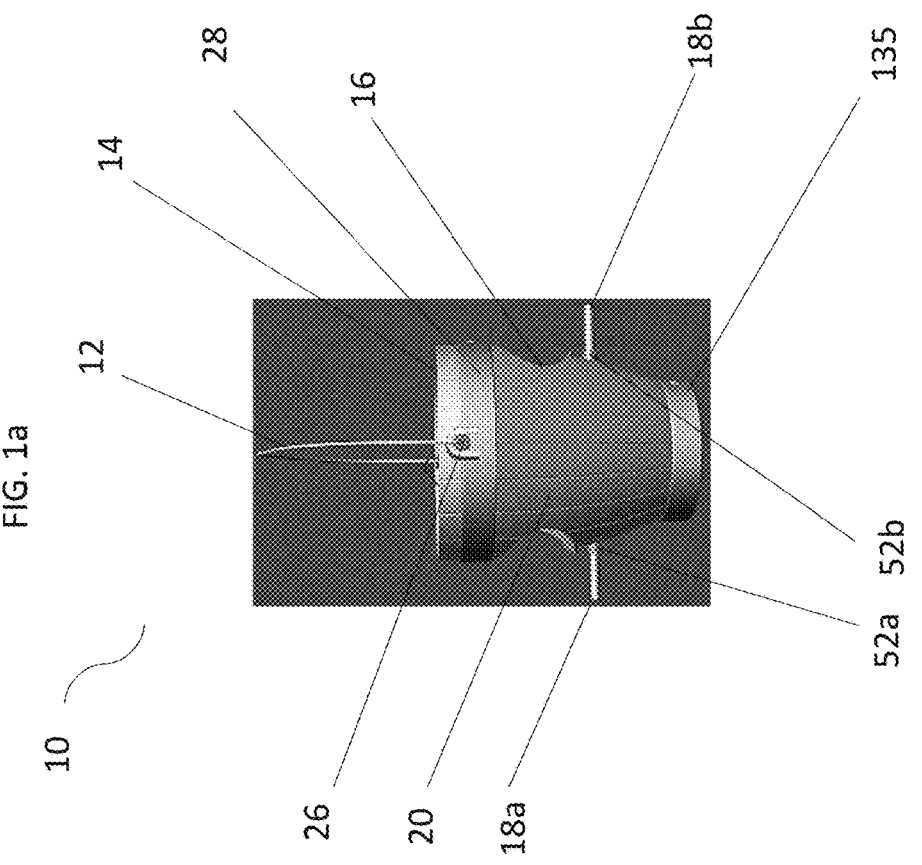
FIG. 1a illustrates a side view featuring the feeding hole of one embodiment of the bird feeder system.

FIGS. 1a and 1b illustrate side views of the preferred embodiment of the bird feeder apparatus 10. The bird feeder apparatus comprises a handle 12, a bird bath structure 14, a main body structure 20, a fixed base 135 (the base may be fixed or removable, as illustrated in FIGS. 3c and 4a-c), at least two perches 18*a* and 18*b*, an upper metal ring 28, at least two handle tabs 26, a feeding hole 16, and a feed surface 34. The handle 12 is in communication with the at least two handle tabs 26 which are in further communication with the main body structure 20.

In one embodiment, there exists a fixed base 135 and in another embodiment as illustrated in FIGS. 3*c* and 4*a-c*, there exists a removable base member 136, in rotatable communication with the main body structure 20. The perches 18 are in removable communication with the main body structure 20 via the receiving mechanisms 52*a* and 52*b*. The bath section 14 is located on the top of the bird feeder system 10. The feeding hole 16 is located in the center of the main body structure 20.

Figure 2:
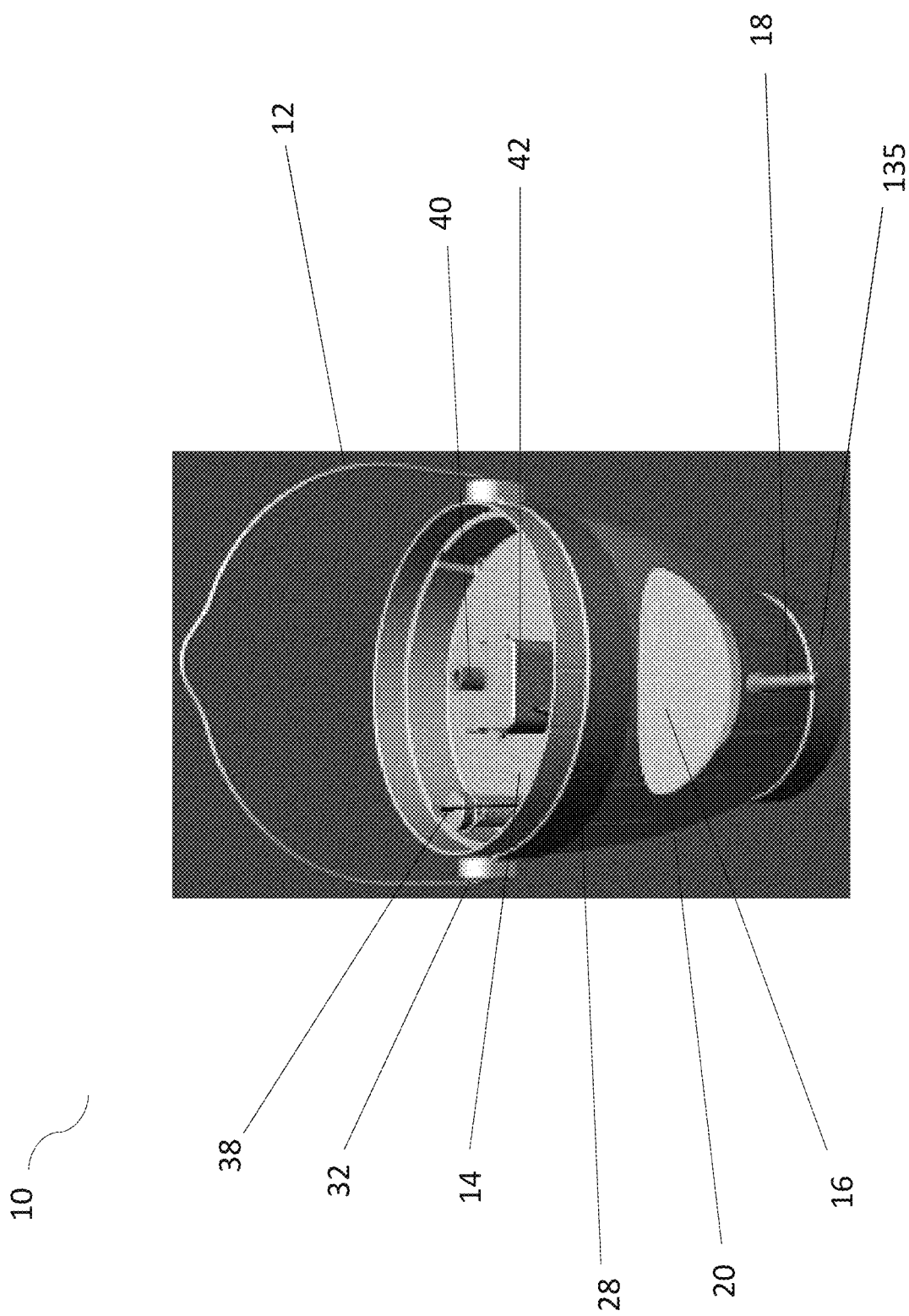
FIG. 2 illustrates a top perspective view of one embodiment of the bird bath structure further illustrating an accompanying fountain mechanism.

FIG. 2 illustrates a top-side view of the preferred embodiment of the bird feeder system 10 and bird bath structure 14 comprises a fountain structure 112. The bird bath structure 14 comprises a centrifugal pump 42 with an impeller apparatus and a filter apparatus, an output tube 40, a power port 82, a power cable 102 and a bath base 104. The output tube 40 is in perpendicular communication with centrifugal pump 42 which is in further communication with the power port 82 via the power cable 102.

FIG. 3*a* illustrates a cross sectional view of one embodiment comprising two perches 18*a*. The at least two perches 18*a* and 18*b* are in communication with the at least two receiving notches 52*a* and 52*b*. In one embodiment, the perches 18 may be attached by pushing until they click into the receiving mechanisms 52*a* and 52*b*. FIGS. 3*b*-3*c* illustrates a dissected view of the preferred embodiment of the output tube 40. The output tube 40, which exists in fluid communication with the centrifugal pump 42, comprises a tube body 41*a* and tube cap mechanism 54. In one embodiment, tube body 41*a* may utilize a single-hole surface creating a spray that shoots up and down in numerous shapes, including an umbrella shape.

In an additional embodiment, the output tube 40 may work in communication with a dancing water attachment mechanism 41*b* which may comprise a multi-hole surface which creates several projections of water.

Further addressing such concerns as installation, operational modes and maintenance of the bird feeder, to install the bird feeder, the user should first place the feeder on a flat, level surface. Next, the user may clip the S-hook to the handle and slide at least one of the two perches into the at least one of the retaining receiving mechanisms 52*a* and 52*b* on either side of the bird feeder, sliding until the perch or perches snap into place. Fill the bowl with water, the water level should just cover the water pump housing. Finally, fill the bird seed compartment with seed and provide power to the fountain system and mechanism.

FIG. 4*a*-4*b* illustrate an assembly view of the preferred embodiment of the pump located at the base of the bird feeder system. The removable base 136 is in removable communication with the body 20. In one embodiment, the removable base 136 is removable via screw communication 64 received by the body screw communication 68. The removable base 136 may include a compartment which comprises the main pump system 51, at least one battery 70, a base lid 72, hardware 73, and at least one aperture 71. The base lid is removably attachable to the base body 63 via the hardware 73 in communication with the at least one aperture 71. FIG. 4*c* illustrates the assembled base 136 attached by a screw assembly to the main body structure 20.

Figure 5:
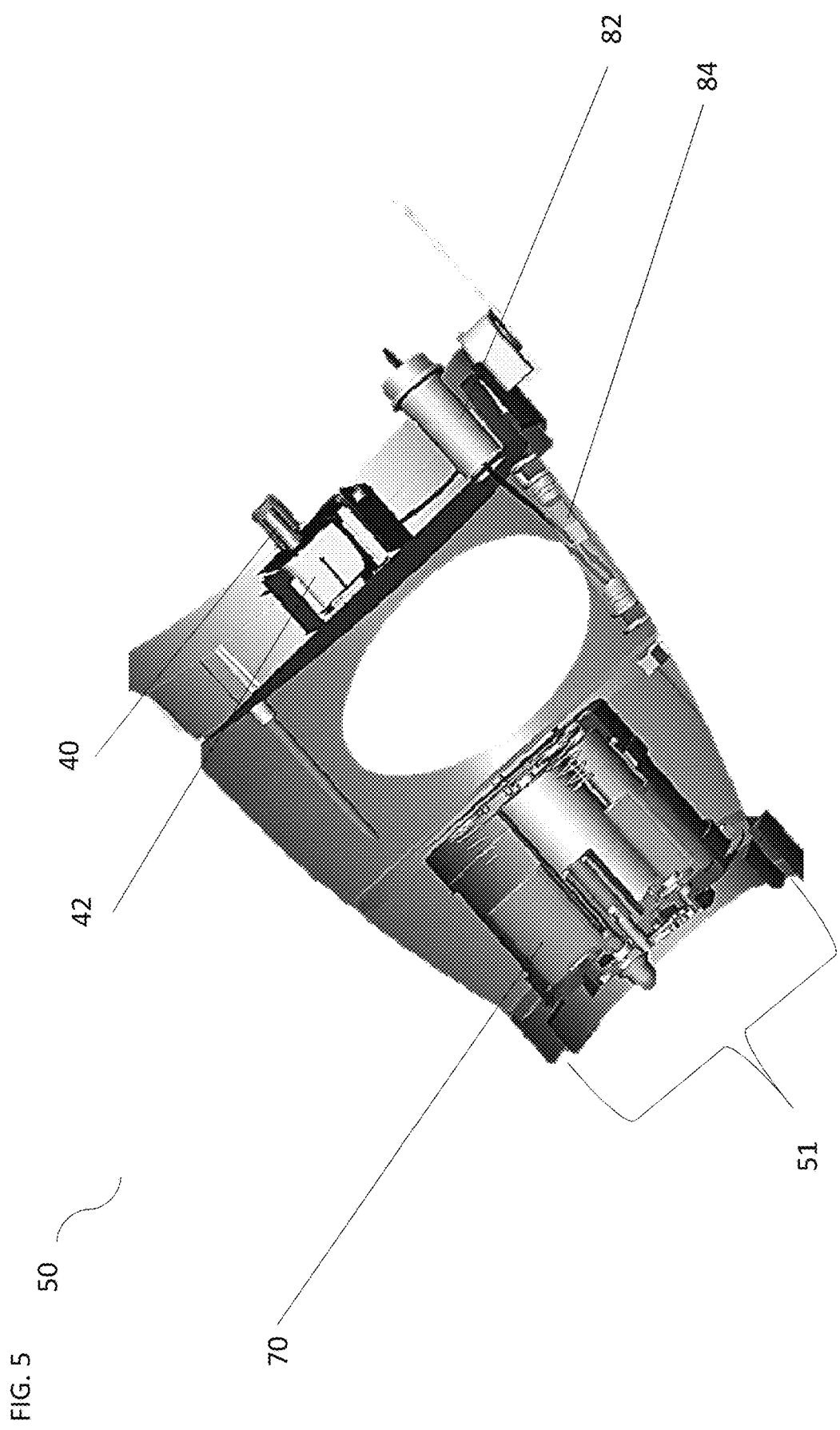
FIG. 5 illustrates a cross-sectional view of the present apparatus further illustrating the interior pump system and battery compartment.

FIG. 5 illustrates a cross-sectional view of the preferred embodiment of the bird feeder system 10 illustrating the interior pump system 50. The interior pump system 50 comprises a centrifugal pump 42, an output tube 40, a power port 82, a male/female connector for the power cord 84, and the main pump system 51 with batteries 70. The output tube 40 is in communication with the centrifugal pump 42, which is in communication with the power port 82 which is in further communication with the main pump system 51 via the male/female connector for the power chord 84. The main pump system is powered by at least one battery 70.

Figure 6:
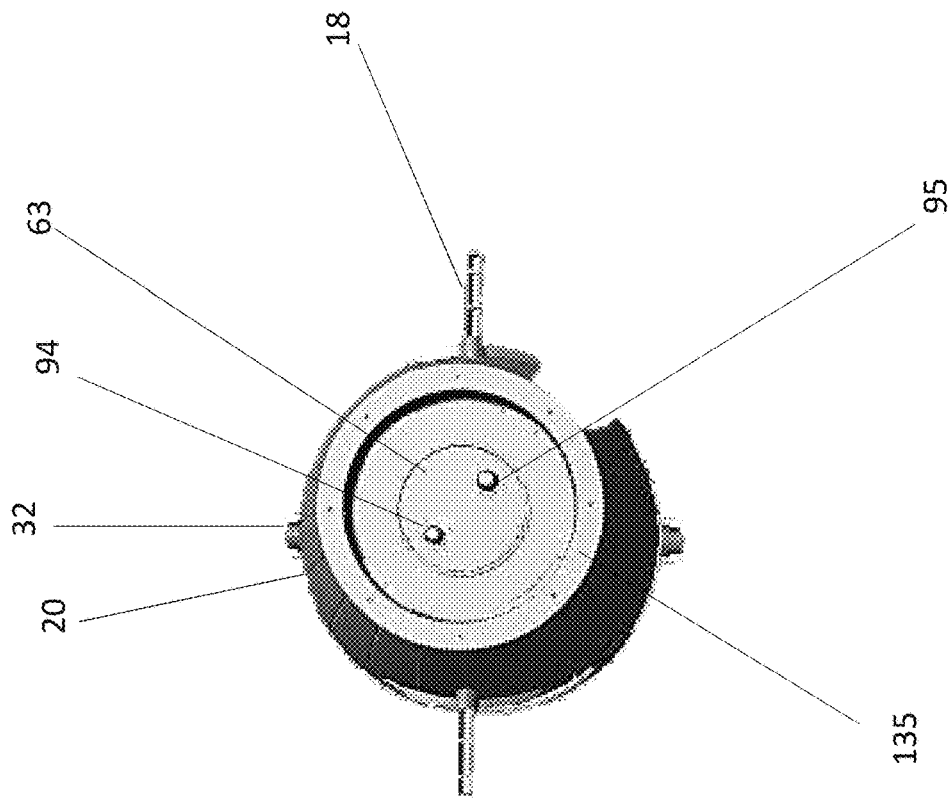
FIG. 6 illustrates a bottom view of the preferred embodiment of the bird feeder system.
Figure 10:
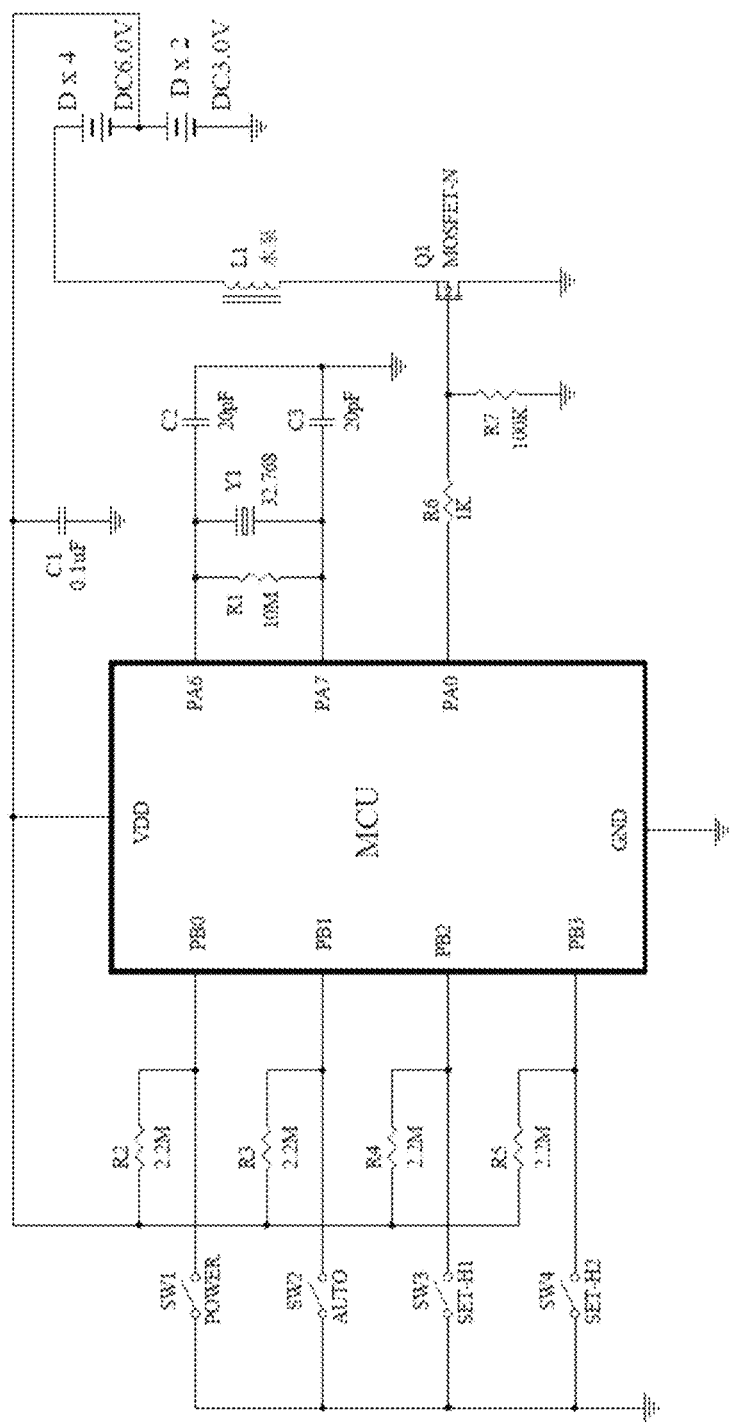
FIG. 10 illustrates a schematic drawing of the electrical distribution system including the electrical operations of the pumping system.

FIG. 6 illustrates a bottom view of the preferred embodiment of the bird feeder system 10. The base 135 comprises a base body 63 a power switch 94 and a timer switch 95. The power switch 94 turns the pump system 50 on, off and to automatic mode. Once in automatic mode, the timer switch 95 can be turned on which allows the pump system to turn on for a designated amount of time, at the end of which it automatically shuts off. The timer switch 95 can be set to one, two, three or four hours.

Figure 7:
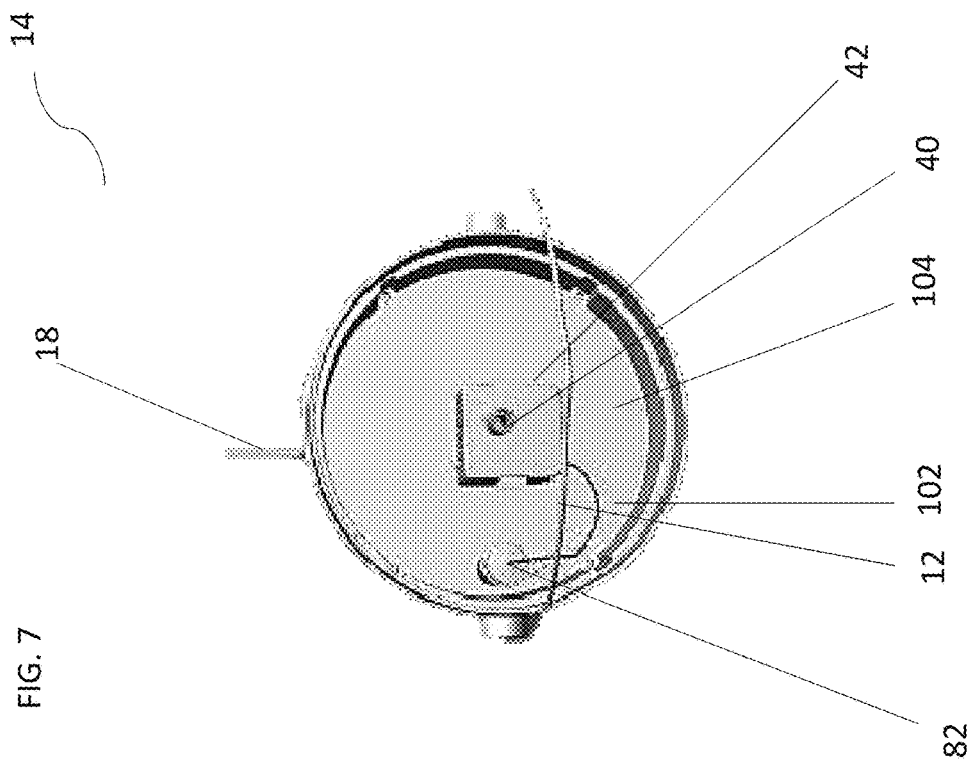
FIG. 7 illustrates a top view of the preferred embodiment of the bird feeder system.

FIG. 7 illustrates a top view of the preferred embodiment of the bird feeder system 10. The bath section 14 comprises a centrifugal pump 42, an output tube 40, a power port 82, a power cable 102 and a bath base 104. The centrifugal pump 42 is in communication with the bath base 104 and the output tube 40 and in further communication with the power port 82 via the power cable 102.

FIG. 8 illustrates a side view of one embodiment of the bird feeder system 10 resting on a flat surface such as a table 116 and with picture displays of bird feeder 114 and water fountain 112.

FIG. 9 illustrates a side view of one embodiment of the bird feeder system 10 while in use with the fountain 112 activated and the system hanging by the handle 12. Additionally, the bird feeder system 10 may be powered by solar panels 8 located on the main body or solar panels 9 located remotely.

FIGS. 10-13 illustrate schematic, graph and flow chart drawings of the electrical distribution system 130 including the electrical operations of the pumping system. There may be varying schematics for the timing of various different models or different modes of operation, including but not limited to, a hour repeat timing cycles or pump power adjustment for different water patterns.

The electrical system uses an OTP IC, Crystal which uses 32768 Hz. It requires a time accuracy of +/−1.5 seconds per day. The operating voltage comprises the use of four large "D" batteries with a voltage of 6.0V power supply. The power supply controls the timer which can be set to the time of the output pump via the switch. Shared I/O feet 7: 2 for the crystal, four of which are for the switch input pins while the other one is for the output pin PA0. Use of the four switching systems (SW1~SW4), active low, the switch function is as follows: SW1—switch is "H" is OFF, switch is "L" when the POWER ON, PA0 output high to the load work; SW2—switch is "H" is OFF, switch is "L" when the AUTO mode, detect SW3, SW4 in what.

FIG. 11 illustrates a graph of the electrical distribution system including the electrical operations of the pumping system. FIG. 12 illustrates a graph drawing of the electrical distribution system including the electrical operations of the pumping system, wherein the table shows SW3, SW4 switch position selection PA0 fast cycle output schedule.

Figure 13:
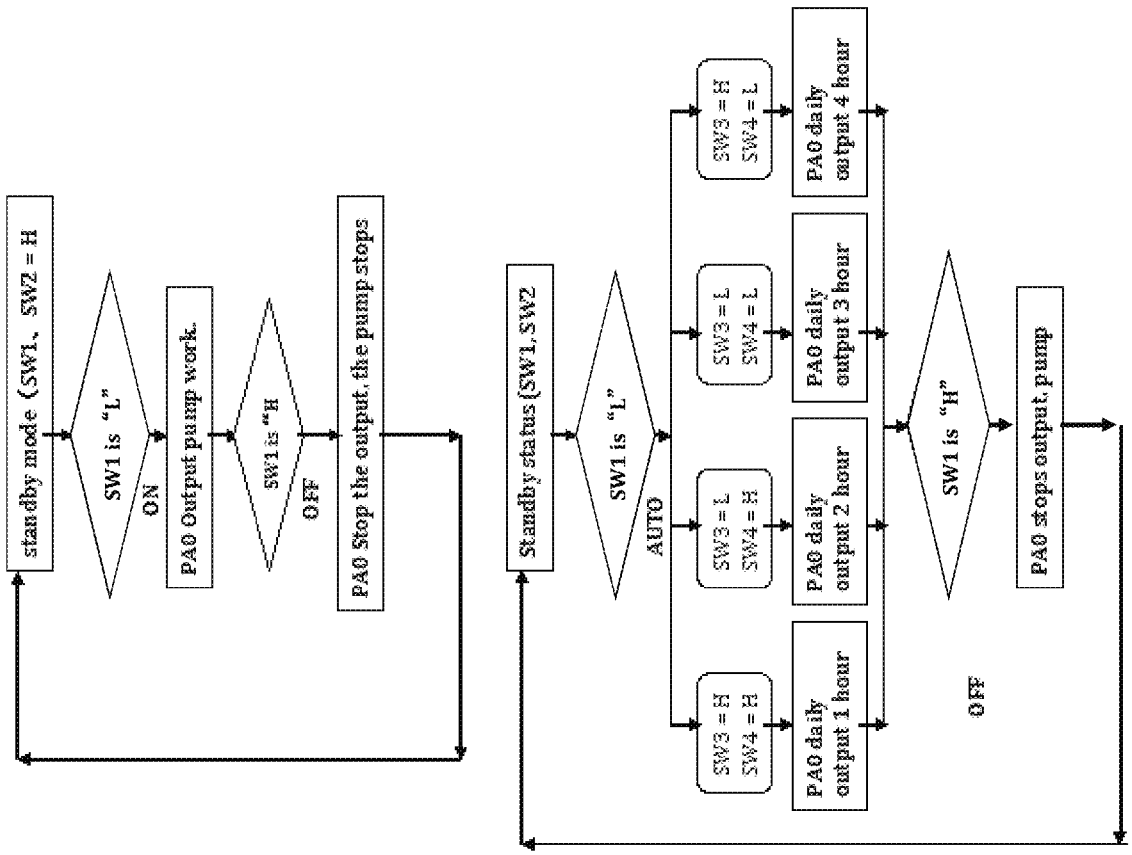

The state to determine a certain period of time every day PA0 output high to load working time consists of setting the hourly function of 1-4 hours a day. The SW3, SW4 switch functions, allow the user to choose 1 to 4 hours a day PA0 timing output to the load working time selection which is shown in FIG. 11. The SW3, SW4 only with SW2 work (SW2 is "L" SW3, SW4 have a role, and SW1 has nothing to do). The SW1) switch trigger logic table is depicted in FIG. 13. Each function switch in the use of the species can be switched at any time, switch to switch to which function immediate use. One example is the SW3, SW4 switch set in 2 hours timer working state, then SW3, SW4. With the switch set in 3 hours after the timer time, PA0 immediately transferred to the load for 3 hours to work. Afterwards, each day will be at the same time, PA0 output 3 hours to load the work. Otherwise you need to re-set the SW3, SW4 switch position to change time.

To activate the production test mode, the test mode Operating steps need to be entered. The first step is to Switch: SW1, SW2=H, SW3=H, SW4=L, in the power supply for 5 seconds. The second step is to Start SW1→L→H, SW2→L→H, SW1→L→H, SW2→L before entering test mode, and PA0 has: 2 times continuous pulse output: H=0.5S→L=0.5 S→H=0.5S output for prompt. After 3 seconds in the test mode, SW3→L, PA0 output 1 second, such as more than 3 seconds SW3→L or other changes, PA0 will always have output, until SW1 or SW2 changes out of the test Mode back to normal state. Next, in the 3 seconds, SW4→H, PA0 output 1 second, such as more than 3 seconds PA0 will always have output. In 3 seconds, SW3→H, PA0 output 1 second, such as more than 3 seconds PA0 will always have output. After passing the ⑤ point, PA0 and then continue to output two pulses: H=0.5S→L=0.55→H=0.5S after the stop, wait for the following input: 7. If SW1 or SW2 changes, that is, exit the test mode, return to normal state.

If there is no change, wait 2 seconds, then check SW3, SW4 switch in which position to determine the PA0 fast cycle mode output, as shown in Table 1: Repeat cycle output repeat cycle output repeat cycle output repeat cycle output. When PA0 is cycled on the table, such as SW1, SW2, SW3, SW4 switches have any 1. A switch has changed, that is, exit the test mode, back to the normal state (that is, where the detection switch, It will work in the state of the corresponding switch).

Figure 14:
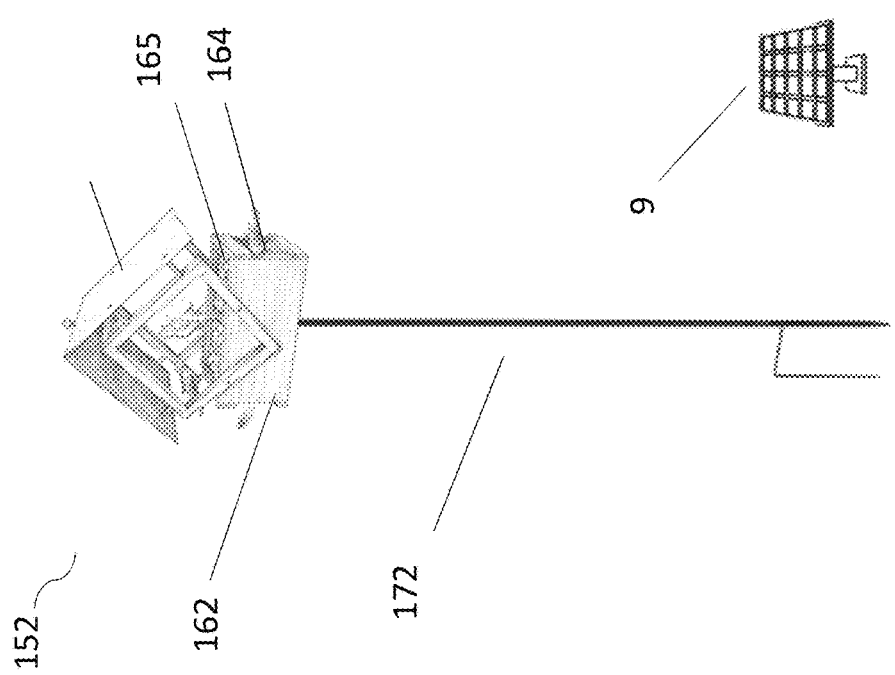
FIG. 14 illustrates a front perspective view of an additional embodiment of the bird feeder and fountain system while in use with the fountain system activated, illustrating the main body or frame of the system and illustrating the system mounted on a static mounting mechanism comprising an additional single-member support mechanism. One of the side feeding chambers is visible, with two feeding chambers normally embarked.

FIG. 14 illustrates a front perspective view of an additional embodiment of the bird feeder and fountain system while in use with the fountain activated, illustrating the main body or frame of the system and illustrating the system mounted on a static mounting mechanism comprising an additional single-member support mechanism. Additionally, the bird feeder system 10 may be powered by solar panels 208 located on the main body or solar panels 209 located remotely.

Figure 15:
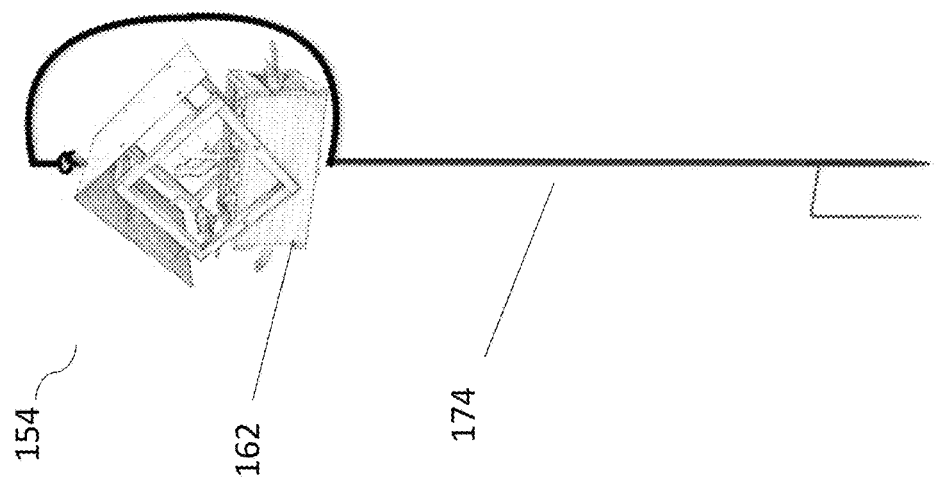
FIG. 15 illustrates a front perspective view of an additional embodiment of the bird feeder and fountain system with the fountain activated and the system mounted on a static mounting mechanism comprising an additional single-member support mechanism. One of the side feeding chambers is visible.

FIG. 15 illustrates a front perspective view of an additional embodiment of the bird feeder and fountain system 154 with the fountain activated and the system mounted on a static mounting mechanism comprising an additional single-member support mechanism.

Figure 16:
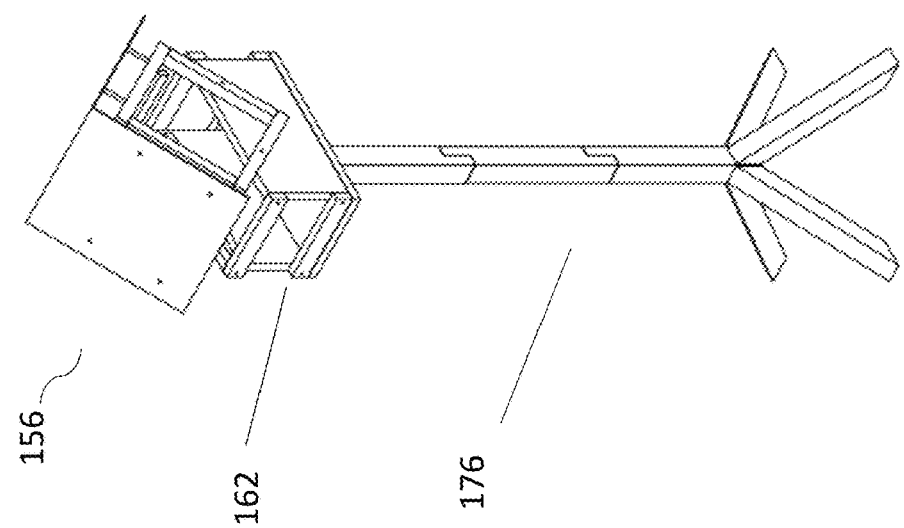
FIG. 16 illustrates a front perspective view of an additional embodiment of the bird feeder and fountain system not in use and with the fountain mechanism removed and the system mounted on an additional folding embodiment of the static mounting mechanism comprising a multi-member support mechanism. One of the side feeding chambers is visible.

FIG. 16 illustrates a front perspective view of an additional embodiment of the bird feeder and fountain system 156 not in use and with the fountain mechanism removed and the system mounted on an additional folding embodiment of the static mounting mechanism comprising a multi-member support mechanism.

Figure 17:
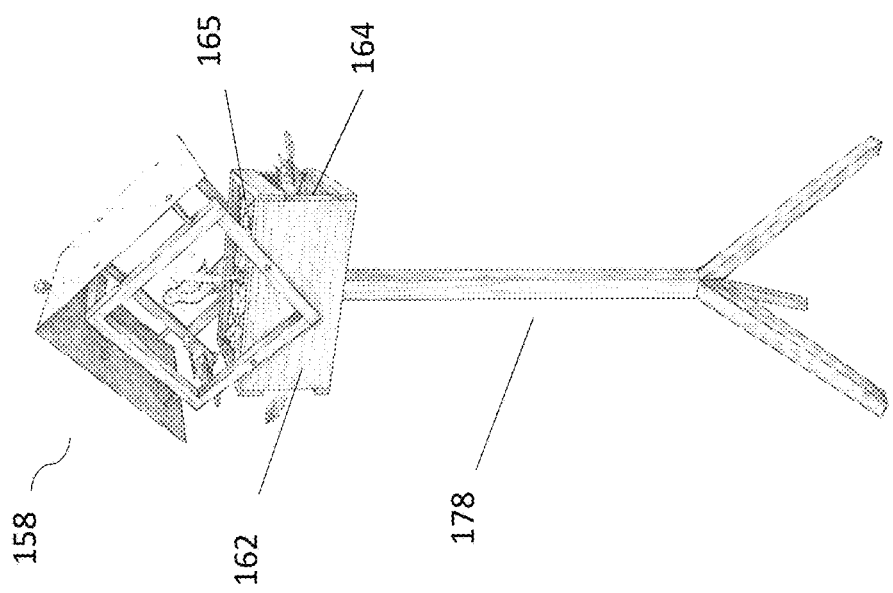
FIG. 17 illustrates a front perspective view of an additional embodiment of the bird feeder and fountain system with the fountain activated and the system mounted on a static mounting mechanism comprising an additional embodiment of the multi-member support mechanism. One of the side feeding chambers is visible.

FIG. 17 illustrates a front perspective view of an additional embodiment of the bird feeder and fountain system 158 with the fountain activated and the system mounted on a static mounting mechanism comprising an additional embodiment of the multi-member support mechanism.

Figure 18:
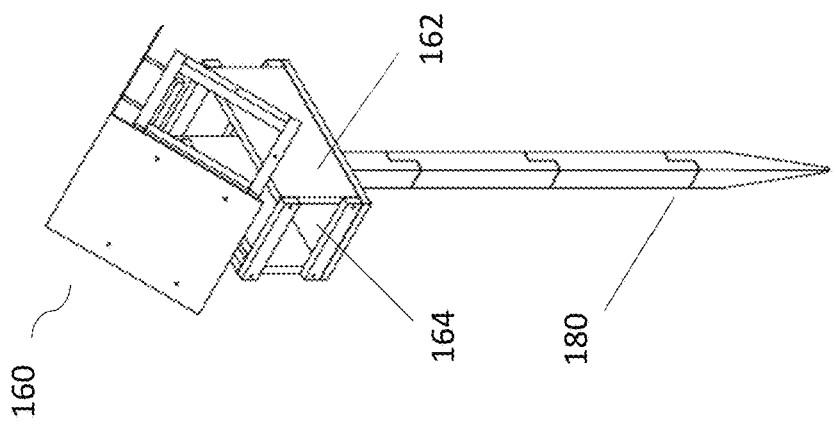
FIG. 18 illustrates a front perspective view of an additional embodiment of the bird feeder and fountain system not in use and with the fountain system removed and the system mounted on an additional folding embodiment of the static mounting mechanism comprising a singular mounting mechanism with no extraneous supports. One of the side feeding chambers is visible.

FIG. 18 illustrates a front perspective view of an additional embodiment of the bird feeder and fountain system 160 not in use and with the fountain system removed and the system mounted on an additional folding embodiment of the static mounting mechanism 180 comprising a singular mounting mechanism with no extraneous supports. One of the side feeding chambers 164 is visible.

Figure 19:
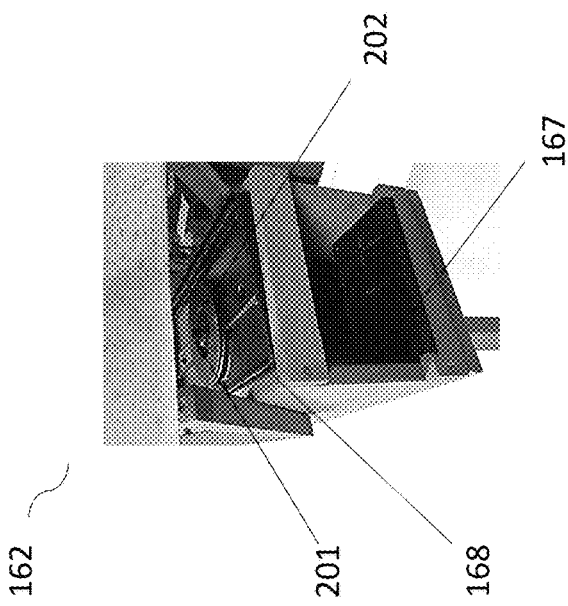
FIG. 19 illustrates a side perspective view of an the main body of an additional embodiment of the bird feeder and fountain system further illustrating one of the side removable feed trays and the upper removable tray, which can be utilized as a feed tray, a habitat tray or an ornament tray. The upper removable tray also acts as a receiving flange for the water fountain system and nozzle.

FIG. 19 illustrates a side perspective view of an the main body 162 of an additional embodiment of the bird feeder and fountain system 152, 154, 156, 158 and 160 further illustrating one of the side removable feed trays 167 and the upper removable tray 168, which can be utilized as a feed tray, a habitat tray or an ornament tray. The upper removable tray 168 also acts as a receiving flange for the water fountain system 200 and nozzle 201.

Figure 20:
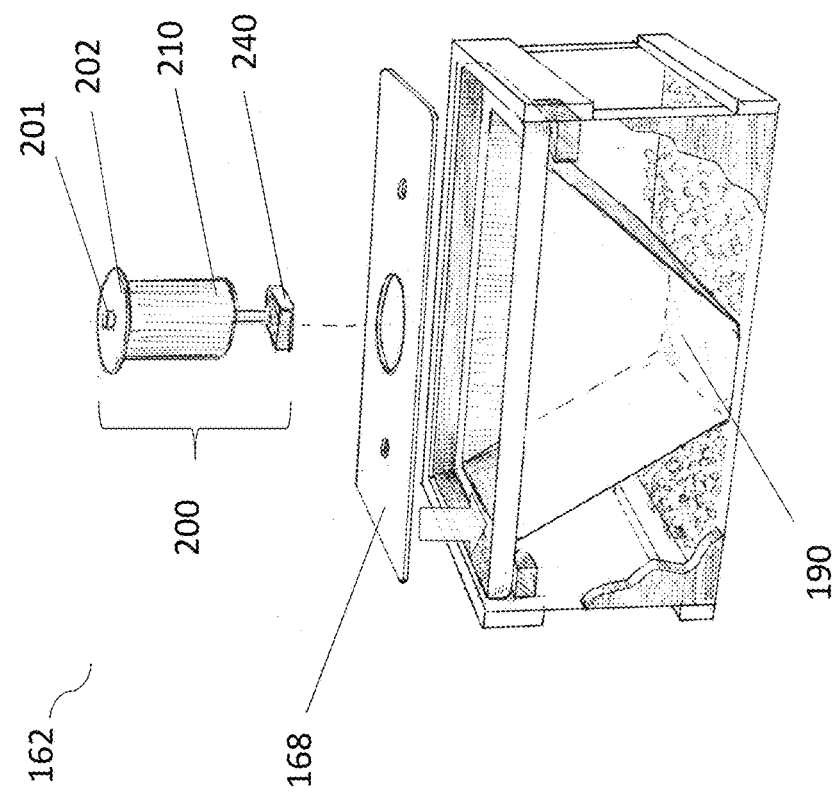
FIG. 20 illustrates a front perspective view of the main body or frame of an additional embodiment of the bird feeder and fountain system, further illustrating the divided compartment for retaining the pump of the fountain system in a submerged manner in conjunction with a fluid to be pumped.

FIG. 20 illustrates a front perspective view of the main body 162 of an additional embodiment of the bird feeder and fountain system, further illustrating the fluid and pump compartment 190 for retaining the pump system 200 in a submerged manner in conjunction with a fluid to be pumped.

Figure 21:
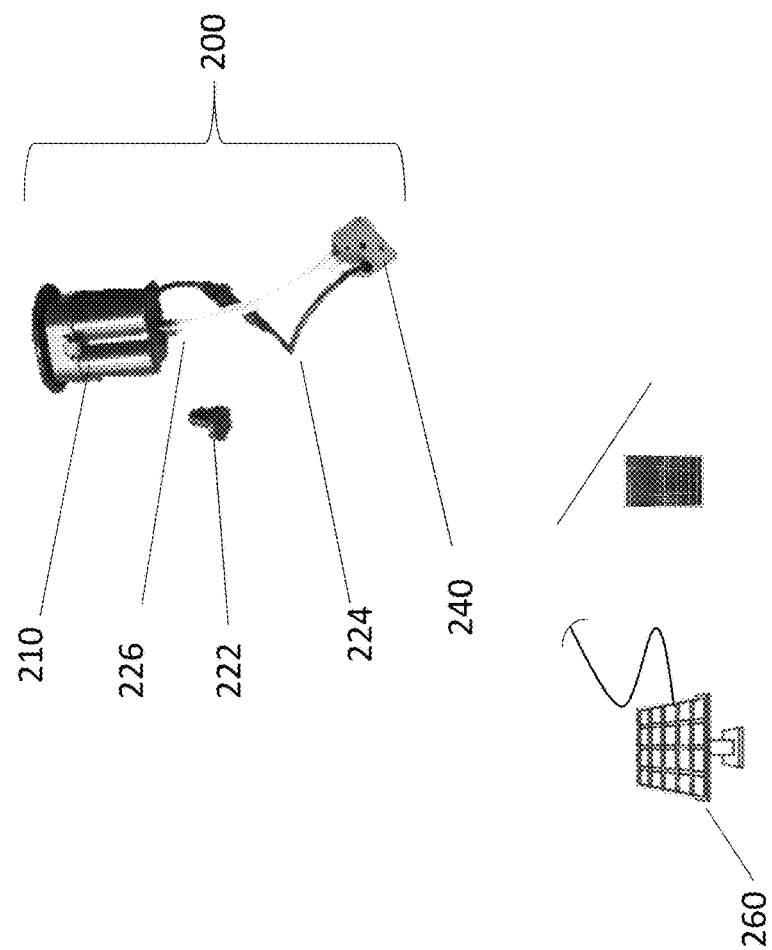
FIG. 21 illustrates a perspective view of the pumping system for an additional embodiment of the bird feeder and fountain system.

FIG. 21 illustrates a front perspective view of the fountain system 200 for an additional embodiment of the bird feeder and fountain system. The fountain system 200 comprises a water pump tube 226, a battery compartment 210, a water pump 240, and a nozzle 201. The battery compartment 210, which powers the fountain system 200 is in electrical communication with the interface plate of the water pump 240 by way of the water pump power cord 224. The water pump 240 is in further communication with the water pump tube 226 which is in further communication with the nozzle 201 completes the flow of fluid.

The battery compartment 210 may utilizes clips for assembly and retention of the battery compartment. The clips may be released in order to access the plurality of batteries. The plurality of batteries is inserted into the battery compartment base which is then attached to the batter compartment top.

The present apparatus is to be used in conjunction with a water source, in one embodiment the fluid and pump compartment 190, from which the water pump 240 may draw water to supply the nozzle 201.

In one embodiment, the system may also include a dancing water 222 attachment in fluid communication with the nozzle assembly 210. When the fountain system is not operating, the user may connect the dancing water attachment 222 to the outlet of the nozzle assembly 201 of the fountain system.

In additional embodiments, the system may incorporate a solar panel for powering the pump, and the solar panel may be physically connected to the system or and a remote located and controlled. Additionally, in one embodiment, the system may utilize a hard corded or fixed corded electrical power option, in addition to the direct battery option.

Further, addressing the operational modes of the bird feeder fountain, as illustrated herein, in one embodiment, the switches are located on the bottom of the Bird Feeder Fountain. In operation, the Switch Position On is design to turn the fountain on and the fountain will continually run until the fountain is manually turned off or will run until the battery set runs down. The Switch Position Off is utilized to turns the fountain off.

In an additional embodiment, the Switch Position Auto is designed to operate the fountain in an automated manner in conjunction with the 1-4 hour timer switch. Thus, in position 1, the system will run for 1 hour with automatic shut off, turns on again daily at the same time. Congruently, in position 2, the system runs for 2 hours with automatic shut off, turns on again daily at the same time, in position 3, the system runs for 3 hours with automatic shut off, turns on again daily at the same time, and in position 4, the system runs for 4 hours with automatic shut off, turns on again daily at the same time.

Regarding battery installation and replacement, the user should ensure that the water is drained if necessary and ensure that the fountain is not running. Next, turn the Bird Feeder upside down for access to the battery compartment and turn the battery housing counter clockwise and lift out battery assembly, making note location of the notch in the housing and battery cable retaining clip.

The user should next turn the bird feeder right side up and set battery compartment next to bird feeder housing and unscrew the battery retaining screws and lift out batteries noting the battery polarity. Next, the user should insert two (2) batteries with the (+) side facing up and two (2) batteries with the (−) facing down, Re-Install the battery retaining screws, Re-insert the battery assembly into the Bird Feeder and turn clockwise. Be sure to align notch in the housing and battery cable retaining clip.

Regarding priming the pump, if you find the water pump is running, but water is not flowing from your fountain, you can try priming the water pump by first ensuring that the pump is completely submerged in water and grab the both sides of the hanging bird feeder and shake gently for about 10 seconds, repeat as needed, this will help dislodge any air bubbles that may be in the air filter/pump assembly. And addressing watering requirements, due to evaporation, ensure that the hanging bird feeder's water pump is always covered with water. Remove any debris that may fall into the Hanging Bird Feeder as water pump performance may be impeded if the intake to the pump is blocked by any debris. Further, in order to keep the fountain free of algae, the fountain requires cleaning with a mild soap and a soft cloth in a disassembled state every two months. To clean your fountain, drain of all water and disassemble.

Regarding maintenance of the water pump, and accompanying filter and impeller, cleaning of the water pump inner portions should occur periodically. At very least after six weeks of usage, the water pump filter and impeller to should be cleaned. In order to accomplish cleaning of the filter, first remove the water pump cover by grabbing the sides and pulling the water pump cover up and off the unit. Second, remove the air filter from in front of the water pump. Third, rinse the air filter until all debris has been removed and finally replace the air filter to the front of the water pump and in turn replace the water pump cover.

In order to accomplish cleaning of the water pump impeller, first remove the front panel of the water pump by grabbing the sides of the front panel and pull the cover off of the unit. Second remove the tightly fitted impeller chamber cover and the impeller from the impeller chamber. Third, rinse the impeller until all debris has been removed and replace the impeller in the impeller chamber. Finally, restore the impeller chamber cover and the pump front panel to the normal positon for future usage.

In an additional embodiment, a system including a bird feeder and optional water fountain apparatus is disclosed. The system may comprise numerous configurations and utilize differing materials, including but not limited to wood, polymeric extracts, carbon fiber extracts including but not limited to composites and laminates.

What is claimed is:

1. A bird feeder apparatus comprising:
   a main body, wherein the main body comprises:
      an upper portion comprising:
         a fluid containment vessel; and
         a fountain apparatus located within the fluid containment vessel; and
         a pump system;
      a lower portion comprising:
         a bird feeder;
      a base member, wherein the base member is attached with the main body and further comprises:
         a battery compartment integral with the base member containing a set of batteries to power the fountain apparatus; and
         a power switch and a timer switch located on a bottom of the base member.

2. The bird feeder apparatus of claim 1, wherein the base member is selected from the group consisting of a fixed base member and a removably attached base member in communication with the main body structure.

3. The bird feeder apparatus of claim 1 further comprising: at least one perch member, wherein the at least one a perch member is a removably attached perch member; and at least one receiving mechanism disposed to removably retain the at least one perch member.

4. The bird feeder apparatus of claim 1 further comprising: a handle mechanism; an upper metal ring; at least two handle tabs; a feeding hole; and, a feed surface; wherein the pump system comprises a centrifugal pump apparatus, an output tube, a power port, a power cable and a bath structure base wherein the output tube is in fluid communication with centrifugal pump and wherein the centrifugal pump is in electrical communication with the power port via the power cable; and wherein the handle is in rotational communication with the at least two handle tabs and wherein the at least two handle tabs are in communication with the main body structure.

5. The bird feeder apparatus of claim 1 wherein the fountain apparatus comprises at least one operational switch, wherein the at least one operational switch may be selected from the group consisting of the power switch and the timer switch, wherein the power switch comprises a Switch Position On mode disposed to activate the fountain apparatus wherein the fountain apparatus will continually operate until the fountain is manually turned off or will run until a battery set runs down and further comprises a Switch Position Off mode disposed to de-activate the fountain apparatus.

6. The bird feeder apparatus of claim 5 wherein the power switch comprises a Switch Position Auto mode disposed to operate the fountain system in an automated manner in conjunction with the timer switch; and wherein the timer switch comprises at least two timer switch positions disposed to operate the fountain system in specifically timed increments and deactivate the fountain system.

7. The bird feeder apparatus of claim 5 wherein the fountain apparatus further comprises a tube cap mechanism wherein the tube cap mechanism comprises a structure selected from the group consisting of a single-hole surface and a multi-hole surface.

8. The bird feeder apparatus of claim 5 wherein the fountain apparatus comprises at least two operational switches, wherein the at least two operational switches comprise a power switch and a timer switch.

9. The bird feeder apparatus of claim 8 wherein the power switch comprises a Switch Position Auto mode disposed to operate the fountain system in an automated manner in conjunction with the timer switch.

10. The bird feeder apparatus of claim 8 wherein the timer switch comprises at least one timer switch position, at least one power level position, light switch and wherein the at least one timer switch position is disposed to operate the fountain apparatus in specifically timed increments and then deactivate the fountain system.

11. The bird feeder apparatus of claim 10 wherein at least two timer switch positions comprise four timer switch positions, wherein the four timer switch positions are segmented in hourly increments.

\* \* \* \* \*